United States Patent [19]

Masaki

[11] Patent Number: 5,429,984

[45] Date of Patent: Jul. 4, 1995

[54] METHOD OF DISCHARGE PROCESSING OF SEMICONDUCTOR

[75] Inventor: Takeshi Masaki, Kawasaki, Japan

[73] Assignee: Matsushita Electric Industrial Co., Ltd., Osaka, Japan

[21] Appl. No.: 219,295

[22] Filed: Mar. 28, 1994

Related U.S. Application Data

[63] Continuation of Ser. No. 786,175, Oct. 31, 1991, abandoned.

[30] Foreign Application Priority Data

Nov. 1, 1990 [JP] Japan .................................. 2-297979
Nov. 1, 1990 [JP] Japan .................................. 2-297980
Nov. 1, 1990 [JP] Japan .................................. 2-297994

[51] Int. Cl.⁶ ..................... H01L 21/14; H01L 21/306
[52] U.S. Cl. ................................... 437/170; 437/172; 437/203; 219/69.17
[58] Field of Search ............. 204/224 M, 228, 129.15; 219/69.17; 437/170, 172; 156/644, 658

[56] References Cited

U.S. PATENT DOCUMENTS

| | | | |
|---|---|---|---|
| 3,914,170 | 10/1975 | Ballard et al. | 204/224 M |
| 4,131,524 | 12/1978 | Gieles | 204/129.3 |
| 4,510,674 | 4/1985 | Izu et al. | 437/170 |
| 4,534,100 | 8/1985 | Lane | 437/172 |
| 4,735,678 | 4/1988 | Mandigo et al. | 156/645 |
| 4,806,496 | 2/1989 | Suzuki et al. | 437/170 |
| 5,055,637 | 10/1991 | Hagner | 174/260 |
| 5,116,782 | 5/1992 | Yamaguchi | 437/172 |

FOREIGN PATENT DOCUMENTS

| | | | |
|---|---|---|---|
| 61-274820 | 12/1986 | Japan | 219/69.17 |
| 1208872 | 8/1989 | Japan . | |
| 1284764 | 11/1989 | Japan . | |
| 2115335 | 2/1983 | United Kingdom | 204/DIG. 12 |

OTHER PUBLICATIONS

Lahiri, IBM Tech. disclosure Bulletin vol. 22, No. 2, Jul. 1979, pp. 831–832.

"Processing of Si Wafer by Discharge" by N. Koji; the 1987 fiscal year papers of a scientific lecture at the spring meeting of the Japan society for precision engineering; pp., 741 and 742.

"Surface Micromachining of Polymide/Metal Composites for a Shear-Stress Sensor" by M. A. Schmidt et al; Aug. 1987 IEEE.

Yu-Tung Yang, "Semiconducting wafer form shaping with an electric discharge machine", Review of Scientific Instruments, vol. 59, No. 9, Sep. 1, 1988, New York, N.Y., USA, pp. 2094–2096.

*Primary Examiner*—Olik Chaudhuri
*Assistant Examiner*—H. Jey Tsai
*Attorney, Agent, or Firm*—Pollock, Vande Sande & Priddy

[57] ABSTRACT

A method of discharge processing of a semiconductor comprises the steps of: providing a low-resistivity portion on the semiconductor; and application of a given voltage through the low-resistivity portion between the semiconductor and a tool electrode suitably positioned with respect to the semiconductor to discharge the voltage. In the conventional photolithography technique, formation of a through-hole with a good straightness is difficult because of side etching. On the other hand, the prior art discharge processing is difficult to process a semiconductor because a potential barrier occurs, so that a high voltage is required for discharge processing. However, the high voltage deteriorates the semiconductor. In the discharge processing of the invention, a relative low voltage can be used for discharge processing of a semiconductor by providing the low-resistivity portion on the semiconductor. The low-resistivity portion may be formed by deposition of aluminum.

6 Claims, 6 Drawing Sheets

METHOD OF DISCHARGE PROCESSING OF SEMICONDUCTOR

This is Continuation of application Ser. No. 07/786,175, filed Oct. 31, 1991 now abandoned.

BACKGROUND OF THE INVENTION

1. Field of the Invention

This invention relates to a method of discharge processing of a semiconductor.

2. Description of the Prior Art

The prior art methods of processing of semiconductors are roughly divided into two classes. One is a mechanical processing such as cutting. Another is photolithography method for forming electronic circuits. There are a lot of processing methods of photolithography. For example, removing processes such as etching, attaching processes such as deposition, and processing methods of changing characteristic of a substance such as ion injection are known. Though it is easy to form a very fine pattern by these processing techniques, it is difficult to process a semiconductor material with a high aspect ratio because these techniques are only methods for transferring the pattern on a plane to the surface of the semiconductor material as similar to photograph technique. For example, when a hole is formed in a semiconductor material, it is difficult to form a fine hole with a good straightness by etching because side etching occurs in the etching processing at the same time. On the other hand, processing of a semiconductor by discharge processing capable of processing a semiconductor with a high aspect ratio has been tried ("processing of Si wafer by discharge", the 1987 fiscal year papers of a scientific lecture at the spring meeting of the Japan society for precision engineering, p741). However, in such discharge processing, a resistivity of the semiconductor material needs to be lowered to the extent of $10^{-2}$ $\Omega$cm. This is a problem in forming electronic circuits at its peripheral portions. In the case that a resistivity of a material to be processed is higher than this, the processing voltage needs to be increased with the resistivity ("Electric processing handbook", The Nikkan Kogyo shinbun Ltd.). Increase in processing voltage causes problems such as decrease in accuracy.

As mentioned above, the prior art photolithography such as etching is difficult for such processing. Moreover, in the prior art discharge processing, there are drawbacks as follows:

The first is that kinds of material used as a semiconductor material are limited because the resistivity should be low. Further, it is difficult to form an electronic circuit on such low-resistivity material. The second is that the accuracy in processing decreases and the size of a layer whose characteristic is changed by processing becomes large because a high voltage is used, so that energy for processing is large. Further, there is also a drawback that use of a high voltage more than 100 V can cause problems in circuits formed on the semiconductor material.

Moreover, semiconductor sensors and actuators having sizes of millimeters or micrometers are utilized in the following fields:

They are used for sensing of touch in robots with high functions or with actuators, for driving it. Moreover, they are also used for detection in a catheter for medical use, i.e., for diagnosis and medical treatment with it inserted in the body. Further, they are used as a pressure sensor in the fuel injection apparatus of an automobile engine.

In devices for detecting mechanical quantities using semiconductor materials such as the conventional pressure sensors, touch sensors, acceleration sensors, etc., etching techniques mainly used for processing of forming mechanical portions such as a diaphragm or a flat spring. Anisotropic etching processing is used for forming a thin plate portion such as the diaphragm or the flat spring, etc. The anisotropic etching is a method for processing using a characteristic that etching speed varies with crystal orientations or a density of impurities. FIG. 10 is a perspective view of a prior art dynamic sensor as an example of the conventional semiconductor mechanical device (Japanese patent publication No. 1-284764).

Moreover, a motor whose diameter is 100 micrometers as an ultra-micro actuator was produced. The method of its production uses thin film forming technique such as etching technique or deposition.

The ultra-micro sensor or actuator made by the production method using the above-mentioned prior art semiconductor processing technique has advantage effects as follows:

Ultra-fine forming processing is possible. Successive processing is possible by batch processing. Assembling of mechanical parts is easy. Moreover there are advantage effects such that it is possible to form a circuit for converting an electric signal indicative of the detected quantity of the sensor in the same substrate.

However, there are also drawbacks in the forming method of the prior art semiconductor processing technique of sensors and actuators as follows:

The first is that the product is limited to flat forms on a substrate. The second is that though there is the above-mentioned anisotropic etching as a technique for producing a form with a high aspect ratio, there is limitation in orientation of the material. The third is that if through-holes should be formed in the direction of thickness in parallel to each other in the ultra-micro sensors or actuators, it is necessary to provide a relatively large distance between them. The fourth is that in the actuator, the field of application is limited if the form is flat as mentioned above because the method of outputting and size thereof are important.

More specifically, the producing method of the prior art semiconductor processing technique particularly in the sensor will be described as follows with reference to FIGS. 11A and 11B:

FIGS. 11A and 11B are vertical and horizontal cross-sectional views of a prior art sensor for detecting shearing stress of a liquid. Refer SURFACE MICROMACHINING OF POLYIMIDE/METAL COMPOSITES FOR A SHEAR-STRESS SENSOR, Schmidt and another, 1987, IEEE Micro Robots and Teleoperators Workshop for this detection sensor.

In such detection sensors, because it is impossible to provide other circuits or projecting and hollow portions on the sensing surfaces of the sensor, circuits should be formed on the back thereof. Thus, it is necessary to pass a signal by forming a through-hole in the thickness direction. However, it is difficult to pass a lot of signals to the back at high density because a diameter of a through-hole is large according to the prior art semiconductor proceeding technique.

SUMMARY OF THE INVENTION

The present invention has been developed in order to remove the above-described drawbacks inherent to the conventional method of processing of a semiconductor.

According to the present invention there is provided a first method of discharge processing of a semiconductor comprising the steps of: providing a low-resistivity portion on the semiconductor; and application of a given voltage through the low-resistivity portion between the semiconductor and a tool electrode suitably positioned with respect to the semiconductor to discharge the voltage.

According to the present invention there is also provided a second method of discharge processing as mentioned as the first method, wherein the low-resistivity portion is formed by deposition.

According to the present invention there is also provided a third method of discharge processing of a semiconductor as mentioned in the second method, wherein the low-resistivity portion is formed by deposition of aluminum.

According to the present invention there is also provided a fourth method of discharge processing of a semiconductor as mentioned in the first method, wherein the given voltage is supplied by a discharge circuit and is applied between the semiconductor and the tool electrode by connecting the discharge circuit to the semiconductor through the low-resistivity portion and to the tool electrode.

According to the present invention there is also provided a fifth method of discharge processing of a semiconductor as mentioned in the fourth method, wherein the semiconductor comprises an n-type semiconductor material and the tool electrode is connected to a minus output terminal of the discharge circuit and the semiconductor material is connected to a plus output terminal of the discharge circuit.

According to the present invention there is also provided a sixth method of discharge processing of a semiconductor as mentioned in the first method, wherein during application of the given voltage, a position of the tool electrode is controlled such that a through-hole is formed in the semiconductor.

According to the present invention, there is also provided a seventh method of discharge processing of a semiconductor as mentioned in the sixth method, wherein the through-hole is filled with a conductive substance.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of the invention with reference to drawings of FIGS. 1 to 3.

Figure 1:
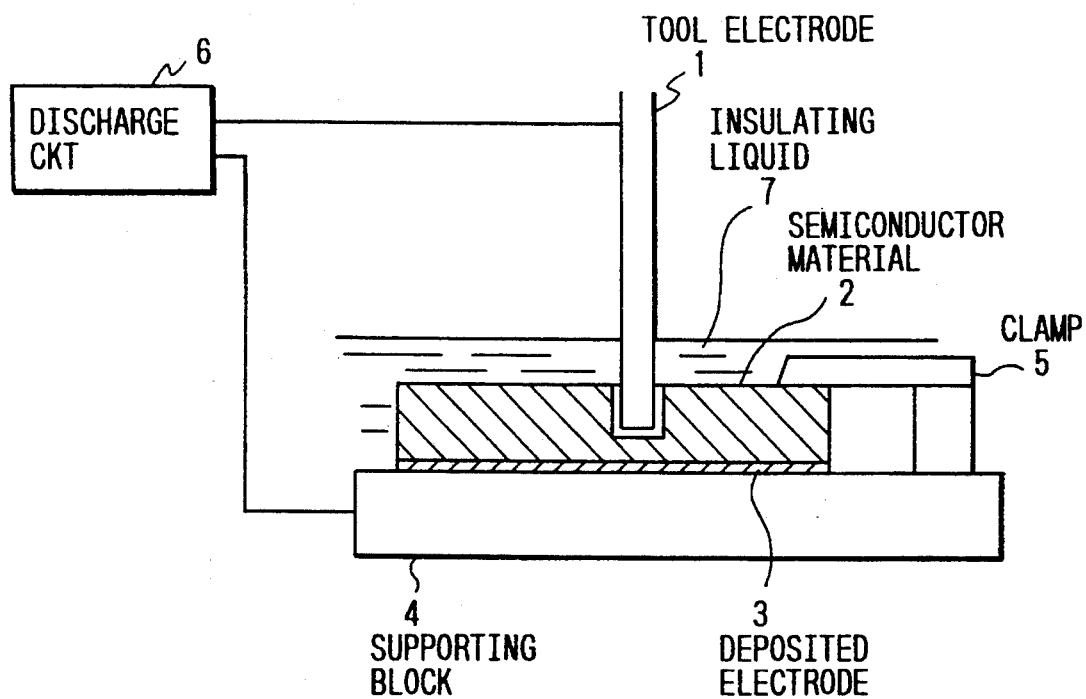
FIG. 1 is a vertical cross-sectional view of a first embodiment of a discharge processing method of a semiconductor of the invention.

FIG. 1 is a vertical cross-sectional view of a first embodiment of a discharge processing method of a semiconductor of the invention.

Numeral 1 is a tool electrode, numeral 2 is a semiconductor material to be processed wherein silicon is used for example, and numeral 3 is an aluminum electrode formed on a surface of the semiconductor material 2 by deposition. Numeral 4 is a supporting block for mounting the semiconductor material to be processed. Numeral 5 is a clamp for fixing the semiconductor material 2 to the supporting block 4. Numeral 6 is a discharge circuit for generating a pulse discharge between the tool electrode 1 and the semiconductor material 2, which comprises an RC circuit or a circuit combining switching elements. Numeral 7 is an insulation liquid.

Then, the processing method will be described. The discharge processing is carried out by application of a given voltage between the tool electrode 1 and the semiconductor material 2 to be processed and putting both close up to a distance of dielectric breakdown of the insulating liquid 7 to generate a discharge for removing-processing. If the material to be processed is a good conductor, it is easy to form a portion for connecting the tool electrode and the material to be processed to the discharge circuit. However, it is problematic that when the material to be processed is a semiconductor and is connected to a metal, there is a barrier at a contacting plane. Because of a potential difference at the barrier, a voltage set to a given value cannot be developed between the tool electrode and the material to be processed, so that discharge cannot be developed or the energy will be extremely small. Therefore, it is important to make the barrier at the contacting plane developed on connecting the discharge circuit 6 as small as possible. In this embodiment, the electrode 3 is formed by deposition to decrease the barrier accompanied by contacting. This enables the potential difference between the semiconductor material 2 and the tool electrode 1 to set sufficiently, so that the discharge processing can be carried out similar to the prior art discharge processing.

Figure 2:
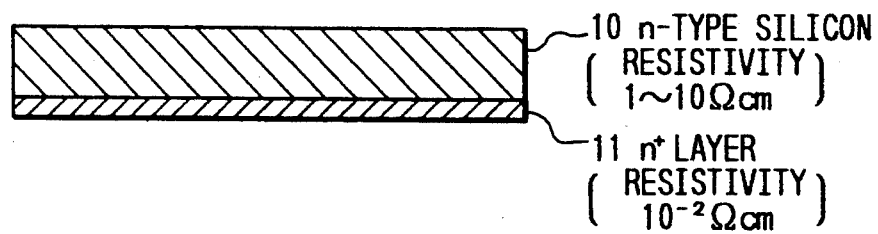
FIG. 2 is a cross-sectional view of a material used in a second embodiment of discharge processing method of the semiconductor.

FIG. 2 shows a material of a second embodiment of discharge processing method of the semiconductor of the invention. Numeral 10 is an n-type silicon, and numeral 11 is an n+ layer formed by doping on a surface of the silicon whose resistivity is about $10^{-2}$ Ωcm.

Figure 3:
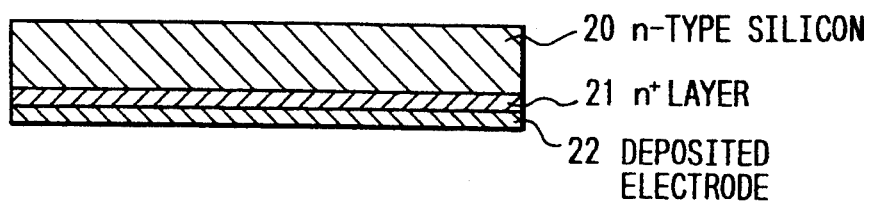
FIG. 3 is a cross-sectional view of a material used in a third embodiment of discharge processing method of the semiconductor.

FIG. 3 shows a material of a third embodiment of discharge processing method of the semiconductor of the invention. Numeral 20 is an n-type silicon, numeral 21 is an n+ layer formed by doping on a surface of the silicon whose resistivity is about $10^{-2}$ Ωcm, and numeral 22 is an electrode formed by deposition on the n+ layer.

As the embodiment mentioned above, discharge processing can be readily accomplished by forming the electrode or a low-resistivity layer on the surface of the semiconductor. However, if the electrode or the low-resistivity layer formed is unnecessary after discharge processing, it is easy to selectively remove the unnecessary electrode or layer by etching technique after the discharge processing.

Hereinbelow will be described a fourth embodiment of the invention with reference to FIG. 4.

Figure 4:
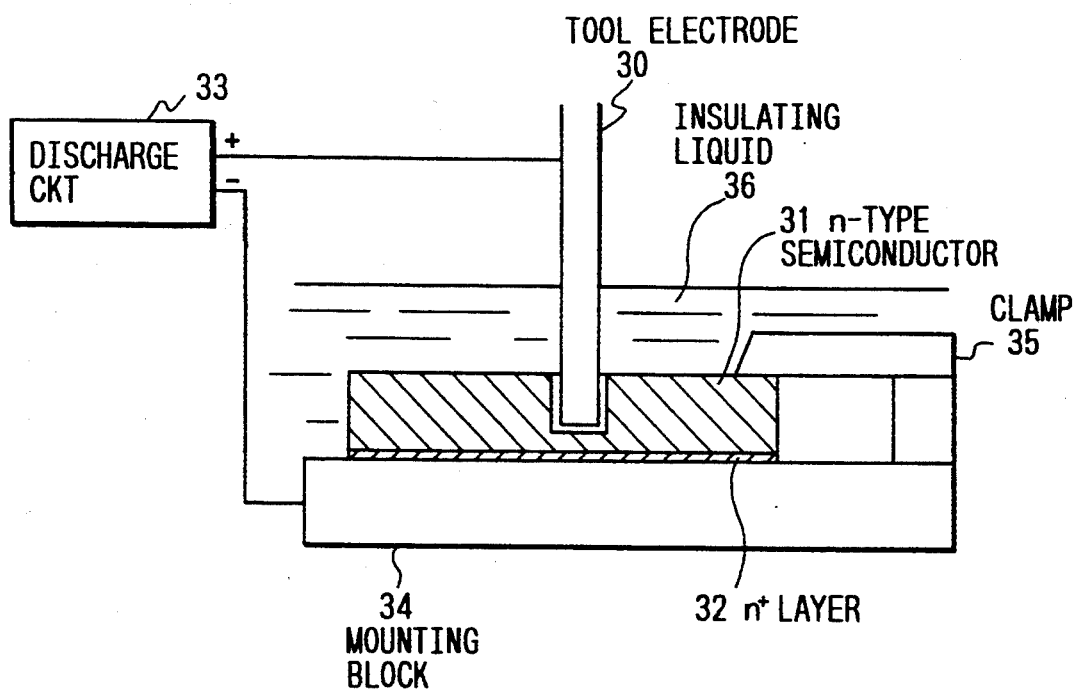
FIG. 4 is a vertical cross-sectional view of the fourth embodiment of discharge processing method.

FIG. 4 is a vertical cross-sectional view of the fourth embodiment of discharge processing method of the semiconductor of the invention. Numeral 30 is a tool electrode, numeral 31 is an n-type semiconductor material, numeral 32 is a deposited electrode formed on the surface of the semiconductor material 31, numeral 33 is a discharge circuit, numeral 34 is a mounting block, and numeral 35 is a clamp. Numeral 36 is an insulating liquid.

Operation will be described. Normally, in the discharge processing, the tool electrode 30 is connected to a minus potential, and a material to be processed is connected to a plus potential to remove a portion of the material. However, if an n-type semiconductor material 31 is processed in the similar way, carriers therein are polarized, so that discharge will not developed. Thus, connecting the tool electrode to the positive potential and the n-type semiconductor to the minus potential causes a current flow in the circuit, so that discharge is developed.

As mentioned, the embodiments show discharge processing is possible for the n-type semiconductor material.

Figure 5:
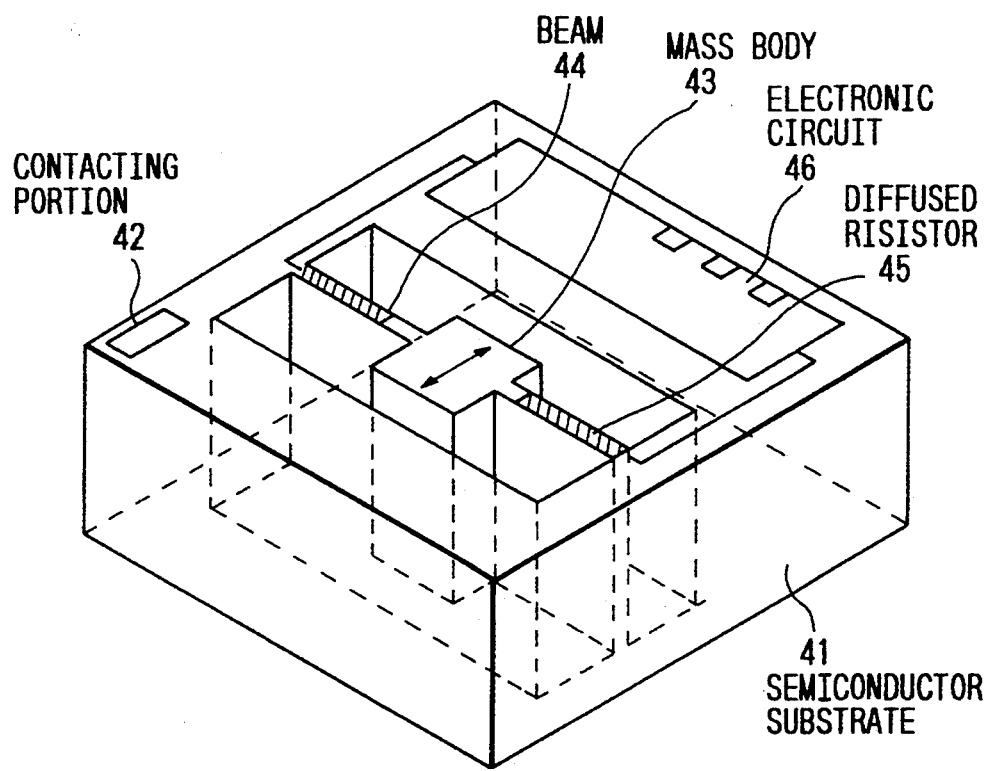
FIG. 5 is a perspective view showing a production method of a semiconductor mechanical device of the fifth embodiment.

Hereinbelow will be described a fifth embodiment of the invention with reference to FIG. 5. FIG. 5 is a perspective view showing structure of a production method of a semiconductor mechanical device of the fifth embodiment of the invention.

In FIG. 5, numeral 41 is a semiconductor substrate, numeral 42 is a contacting portion for ohmic-contacting with the semiconductor substrate 41, numeral 43 is a mass portion formed by discharge-processing the semiconductor substrate 41, numeral 44 is a beam for supporting the mass portion 43, which is integrated with the mass portion. Numeral 45 is a diffused resistor, numeral 46 is an electronic circuit for detecting change of a resistance of the diffused resistor 45.

Then, operation of the above-mentioned fifth embodiment will be described.

The beam 44 is made thin in the direction shown by the arrow shown in FIG. 5, so that the mass portion 3 moves relatively readily. When an acceleration is applied to the semiconductor substrate 41 in the direction of the arrow, the beam 44 is bent by inertia of the mass portion 43, so that the resistance of the diffused resistor 45 varies. A value of the acceleration can be detected by detecting the variation in the resistance by the electric circuit 6.

Figure 6:
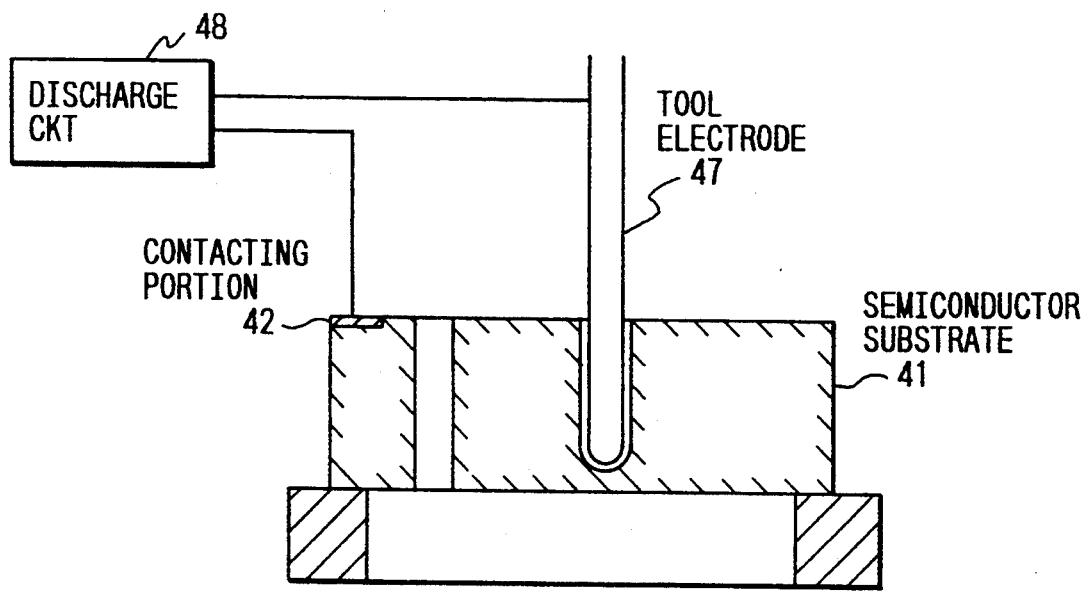
FIG. 6 shows an example of this processing method of the fifth embodiment.

Formation of the thin beam 44 is difficult by the photolithography as mentioned above. Though the discharge processing has a high possibility for such processing, processing the semiconductor material was difficult. However, formation of the contacting portion 42 on the semiconductor substrate 41 for providing ohmic-contacting resolves the problem about contacting with the discharge circuit. That is, contacting portion enables the semiconductor material to be discharge-processed. FIG. 6 shows an example of this processing method of the fifth embodiment.

In FIG. 6, numeral 47 is the tool electrode, and numeral 48 is the discharge circuit for producing pulse discharge between the semiconductor substrate 41 and the tool electrode 47 by application of a high voltage between the tool electrode 47 and the contacting portion on the semiconductor substrate 41 for ohmic-contacting. Providing the contacting of the discharge circuit 48 to the semiconductor substrate 41 through the contacting portion on the semiconductor substrate 41 can produce pulse discharge between the semiconductor substrate 41 and the tool electrode 47. If the discharge circuit 48 is directly connected to the semiconductor substrate 41 without the contacting portion 42, the discharge processing is very difficult because a potential difference will be generated.

According to the above-mentioned embodiment, formation of thin beam 44 in the thickness direction of tile semiconductor substrate is carried out by discharge processing, so that acceleration can be detected because the beam 44 is bent by inertia of the mass portion 43. Moreover, in FIG. 5 acceleration is detected only in one direction. However, it is possible to detect acceleration in plural directions by providing plural detecting portions.

Figure 7:
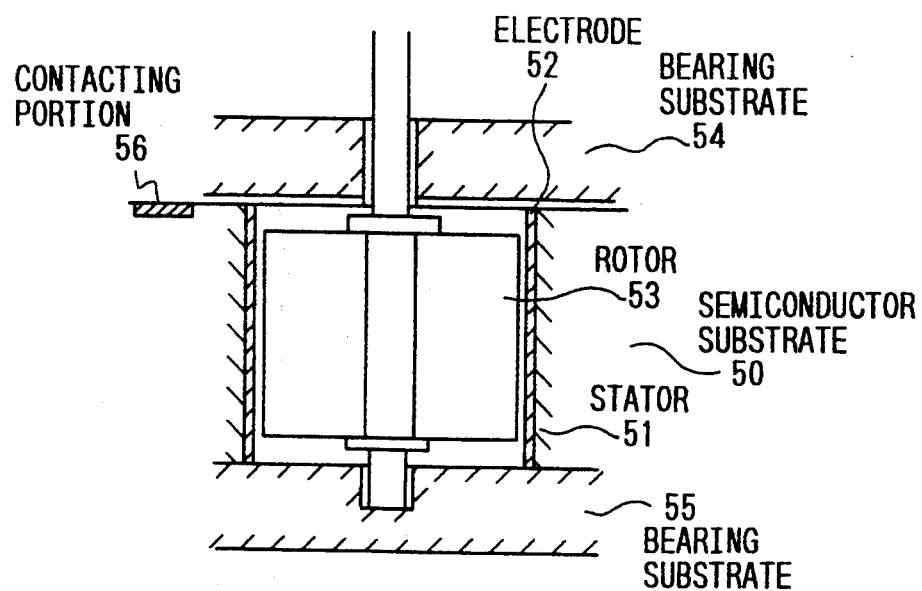
FIG. 7 is a vertical cross-sectional view of a small motor of the sixth embodiment.

Hereinbelow will be described a sixth embodiment of the invention. FIG. 7 is a vertical cross-sectional view of a small motor of the sixth embodiment of the invention.

In FIG. 7, numeral 50 is a semiconductor substrate, numeral 51 is a stator formed on the semiconductor substrate 50, numeral 52 is an electrode so formed as to equally divide a circumference of the stator 51, numeral 53 is a rotor, numerals 54 and 55 are bearing substrate for supporting the rotor 53, and numeral 56 is a contacting portion for providing ohmic contact.

Figure 8:
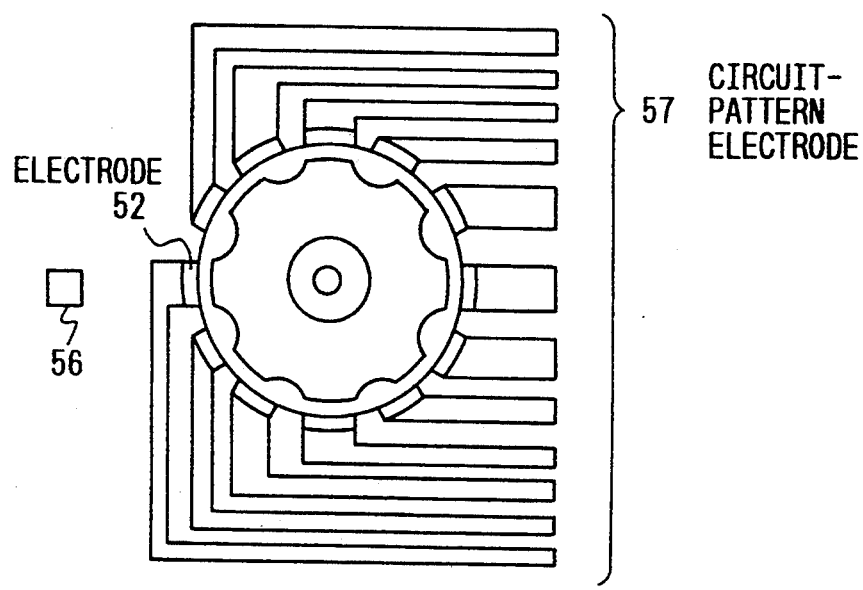
FIG. 8 is a plan view of the small motor of the sixth embodiment.

FIG. 8A–8B plan view of the small motor of the sixth embodiment of the invention wherein the bearing substrate 54 shown in FIG. 7 is removed and numeral 57 are circuit-pattern electrodes for supplying electric power to each electrode 52.

Hereinbelow will be described operation according to the above-mentioned structure and production method.

As similar to the fifth embodiment shown in FIG. 6, the stator 51 is formed by discharge processing by application of a high voltage to the semiconductor substrate 50 through the contacting portion 56. Then, an insulation film is formed on the surface, and the electrodes 52 are formed. If electrodes 52 contact with each other on forming the electrodes 52, contacting portion 56 formed by the discharge processing is removed. After formation of the electrodes 52, the circuit-pattern electrodes 57 are formed. According to the above-mentioned method, the stator 51 whose diameter is ten micrometers can be readily provided.

On the other hand, the rotor 53 is formed by the discharge processing. The bearing substrate 54 and 55 are also produced by the discharge processing of the semiconductor material similarly. Finally, the motor is produced by assembling and fixing each parts.

In operation, the motor is driven by an electrostatic attractive force between the rotor 53 and each of electrodes 52. The rotor 53 is rotated by changing application of voltage to each of electrodes 52.

According to the embodiment mentioned above, it is possible to obtain a high output because though the projected area of the motor are the same, thickness is larger than that of a motor formed flatly.

Moreover, in the above-mentioned embodiment, the electrode 52 and contacting portion 56 are left. However, it is possible to remove them after formation by discharge processing.

As mentioned above, according to this embodiment, a contacting portion 56 for ohmic-contacting is formed on a semiconductor substrate 50. Discharge processing is carried out by application of a voltage between said semiconductor substrate 50 through the contacting portion 56 and a tool electrode 47 to process the semiconductor substrate 50.

Figure 9:
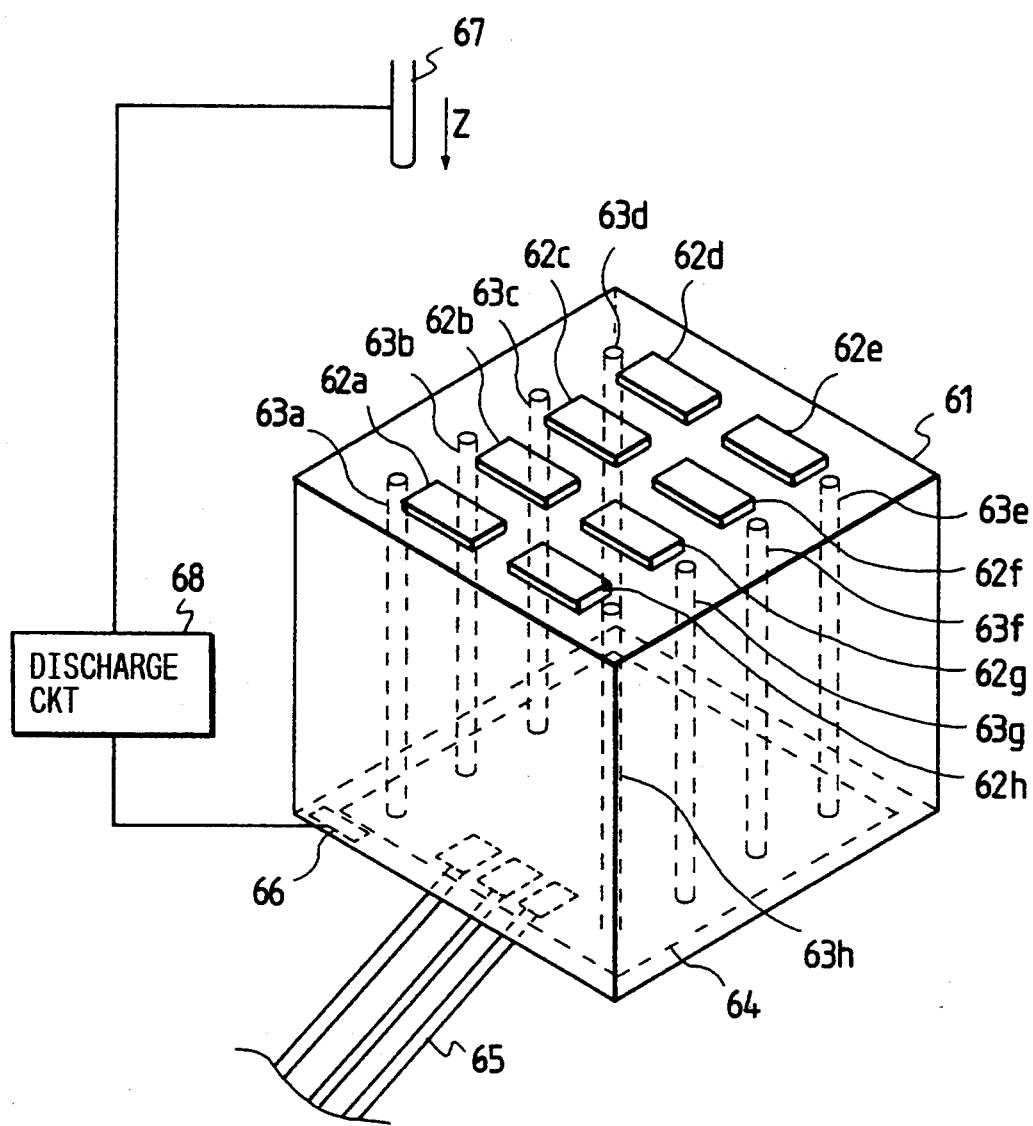
FIG. 9 is a perspective view to show a production method of a semiconductor sensor of the seventh embodiment.
Figure 10:
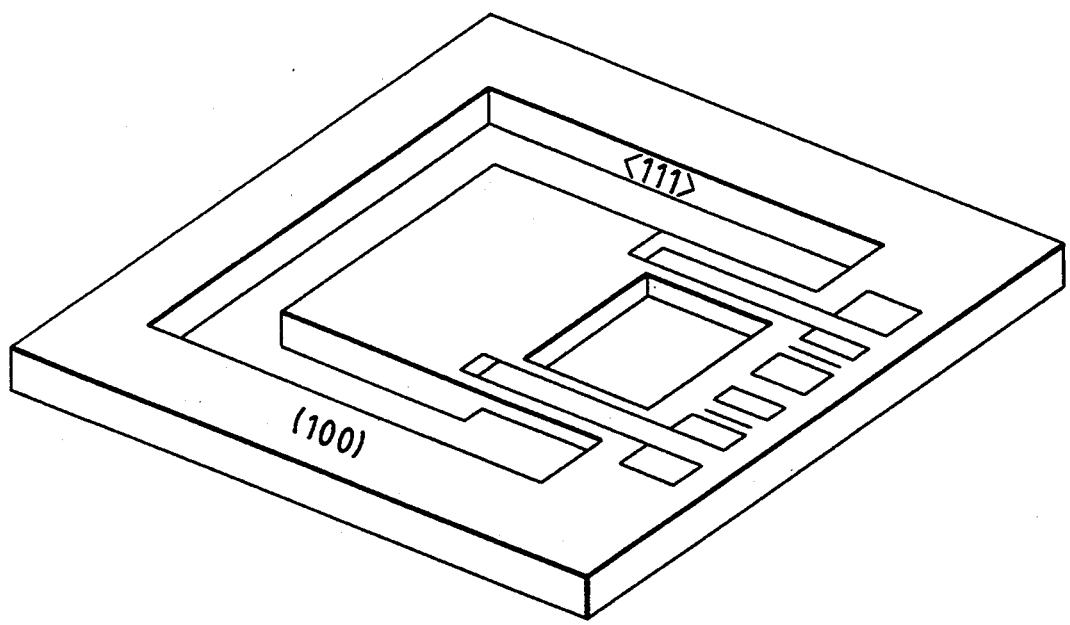
FIG. 10 is a perspective view of a prior art dynamic sensor.
Figure 11A:
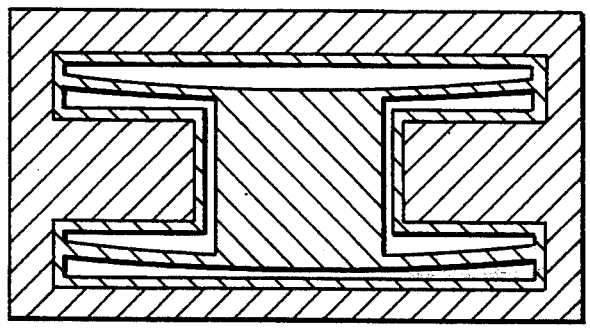
FIGS. 11A and 11B are vertical and horizontal cross-sectional views of a prior art sensor for detecting shearing stress of a liquid.
Figure 11B:
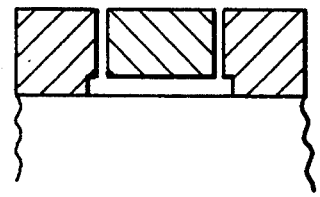

Hereinbelow will be described a seventh embodiment of the invention with reference to drawings. FIG. 9 is a perspective view to show a production method of a semiconductor sensor of the seventh embodiment of the invention.

In FIG. 9, numeral 61 is a semiconductor substrate, numerals 62a to 62h are pressure sensing devices, numerals 63a to 63h are through-holes for passing detection signals to the back therethrough, numeral 64 is an electric circuit for processing the detection signal from the pressure sensing devices, numeral 65 are cables for supplying electric power to the electric circuit 64 and for outputting signals, numeral 66 is a contacting portion for ohmic-contacting with the semiconductor substrate 61.

Then, operation of the above-mentioned structure will be described.

The producing method of the semiconductor sensor of this embodiment detects distribution of pressures applied to a surface of the sensor which are detected by each of pressure sensors 62. Therefore, projecting or hollowing portions cannot be provided on the surface of the semiconductor substrate (the upper side in the drawing) other than tile pressure sensing devices 62. Moreover, there is a limitation on production that it is necessary to arrange through-holes for wiring in parallel. The pressure sensing devices 62a–62h can be produced readily using film forming technique and lithography of the semiconductor processing technique though circumstances are different from each other with sensing types. The through-holes 63a–63h are formed by processing the semiconductor substrate 61 by discharge processing.

It is possible to process and form plate material whose thickness is ten times the diameter of the through-hole. However, though discharge processing of semiconductor materials having low resistivities are easy, discharge processing of materials used for sensors, etc., is difficult because resistivities range from 10° to 10². However, as shown in FIG. 9, it is possible to form through-holes 63a to 63h by forming the contacting portion 66 for ohmic-contacting on the semiconductor substrate 61 and connecting the discharge circuit 68 through the contacting portion 66 to the semiconductor substrate 61 to produce pulse discharge between the semiconductor substrate 61 and the tool electrode 67. The tool electrode 67 is moved along z axis as shown in FIG. 9 such that a through hole 62a is formed during discharging operation.

Therefore, hole-making processing as shown in FIG. 9 is easy and intervals between holes can be extremely small. In the example shown in FIG. 9, after processing for forming the through-holes 63a–63h in the semiconductor substrate 61, an insulation film is formed, and then, a conductor is buried therein. In FIG. 9, one wiring is provided for one device of pressure sensing devices 62a–62h. However, if a plurality of wirings for each of pressure sensing devices 62a–62h, a plurality of through-holes and conductors to be buried can be provided.

The signals going to the back is processed by the electric circuit 64. The electric circuit 64 can be produced by the same method as that used for ordinal LSI. The result processed is outputted from the cable 65.

In the above-mentioned embodiment, the sensor is the pressure sensor. However, a similar advantage effect can be obtained though the detected thing is different from this case. That is, this invention enables providing of a lot of detecting elements at a high density and eliminates the necessity of providing projecting or electric circuits on the surface where detection is carried out.

As mentioned above, according to the invention, a contacting portion 66 for ohmic-contacting is formed on a semiconductor substrate 61, and discharge processing is carried out to form through-holes 63a–63h by application of a voltage between said semiconductor substrate 61 through the contacting portion 66 and a tool electrode to process the semiconductor material and a conductor is buried. A semiconductor substrate 61 is processed by discharge processing by generation of discharge between the semiconductor material and the tool electrode by connecting a discharge circuit to the semiconductor material through an ohmic contact provided on the semiconductor material. The discharge processing makes it possible to make a hole in a semiconductor.

This enables intervals between through-holes (conductors) to be shorter, so that an ultra-micro semiconductor sensor can be provided.

As mentioned above, this invention enables that a semiconductor material is processed by discharge processing by generation of discharge between the semiconductor material and the tool electrode by connecting a discharge circuit to the semiconductor material through an ohmic contact provided on the semiconductor material. This makes it possible to produce a semiconductor mechanical device of a form with a high aspect ratio.

What is claimed is:

1. A method of discharge processing of a semiconductor comprising the steps of:
    (a) forming a doped region on a surface of said semiconductor;
    (b) providing a metal electrode portion partially covering a surface of said doped region of said semiconductor; and
    (c) generating a pulse discharge from a discharge circuit for applying a pulse of a given voltage through said metal electrode portion, between said semiconductor, and a tool electrode positioned with respect to said doped region of said semiconductor so as to discharge a voltage across a gap between said tool electrode and said semiconductor.

2. A method of discharge processing of a semiconductor as claimed in claim 1, wherein said metal electrode portion is formed by deposition.

3. A method of discharge processing of a semiconductor as claimed in claim 2, wherein said metal electrode portion is formed by deposition of aluminum.

4. A method of discharge processing of a semiconductor as claimed in claim 1, wherein said semiconductor comprises an n-type semiconductor material and said tool electrode is connected to a minus output terminal of said discharge circuit and said semiconductor material is connected to a plus output terminal of said discharge circuit.

5. A method of discharge processing of a semiconductor as claimed in claim 1, wherein during application of said given voltage a position of said tool electrode is controlled such that a through-hole is formed in the semiconductor.

6. A method of discharge processing of a semiconductor as claimed in claim 5, wherein said through-hole is filled with a conductive substance.

* * * * *